(12) United States Patent
Banister

(10) Patent No.: US 7,854,095 B2
(45) Date of Patent: Dec. 21, 2010

(54) ELECTRIC TILE MODULES

(76) Inventor: Mark Banister, 6550 E. Miramar Dr., Tucson, AZ (US) 85715

( * ) Notice: Subject to any disclaimer, the term of this patent is extended or adjusted under 35 U.S.C. 154(b) by 0 days.

(21) Appl. No.: 12/501,362

(22) Filed: Jul. 10, 2009

(65) Prior Publication Data

US 2009/0266405 A1 Oct. 29, 2009

Related U.S. Application Data

(60) Division of application No. 11/196,012, filed on Aug. 3, 2005, now Pat. No. 7,578,102, which is a continuation-in-part of application No. 10/222,483, filed on Aug. 16, 2002, now Pat. No. 6,928,775.

(51) Int. Cl.
*E04D 13/18* (2006.01)
*E04H 14/00* (2006.01)

(52) U.S. Cl. ...................... 52/173.3; 136/244; 136/251; 236/84

(58) Field of Classification Search ............... 52/173.3, 52/177, 220.1, 220.2; 136/244, 251, 253, 136/291; 362/84, 24, 26; 174/50, 48, 59
See application file for complete search history.

(56) References Cited

U.S. PATENT DOCUMENTS

| | | | |
|---|---|---|---|
| 4,189,881 A | 2/1980 | Hawley | |
| 4,233,653 A | 11/1980 | Jongerius et al. | |
| 4,321,416 A | 3/1982 | Tennant | |
| 4,419,530 A | 12/1983 | Nath | |
| 4,860,509 A | 8/1989 | Laaly et al. | |
| 5,011,544 A | 4/1991 | Gaddy et al. | |
| 5,022,381 A | 6/1991 | Allegro | |
| 5,070,431 A | 12/1991 | Kitazawa et al. | |
| 5,090,167 A | 2/1992 | Wassell | |
| 5,232,518 A | 8/1993 | Nath et al. | |
| 5,316,592 A | 5/1994 | Dinwoodie | |
| 5,338,369 A | 8/1994 | Rawlings | |
| 5,437,735 A | 8/1995 | Younan et al. | |
| 5,573,600 A | 11/1996 | Hoang | |
| 5,575,861 A | 11/1996 | Younan et al. | |
| 5,590,495 A | 1/1997 | Bressler et al. | |
| 5,647,915 A | 7/1997 | Zukerman | |
| 5,830,779 A | 11/1998 | Bressler et al. | |
| 5,877,874 A | 3/1999 | Rosenberg | |
| 5,990,414 A | 11/1999 | Posnansky | |
| 5,998,729 A | 12/1999 | Shiomi et al. | |
| 6,063,996 A | 5/2000 | Takada et al. | |
| 6,075,201 A | 6/2000 | Wambach | |

(Continued)

FOREIGN PATENT DOCUMENTS

EP 0798787 10/1997

(Continued)

*Primary Examiner*—Richard E Chilcot, Jr.
*Assistant Examiner*—Chi Nguyen
(74) *Attorney, Agent, or Firm*—Hayes Soloway P.C.

(57) ABSTRACT

The electrically connectable tile module includes a porous substrate having a top side, a bottom side, and at least two side edges. At least one connector is integrated into the porous substrate allowing adjoining electrically connectable tile modules to be electrically connected to the porous substrate. At least one electrical element is disposed over the top side of the porous substrate and electrically connected to the at least one connector.

47 Claims, 13 Drawing Sheets

U.S. PATENT DOCUMENTS

| | | |
|---|---|---|
| 6,092,587 A | 7/2000 | Ingram |
| 6,093,884 A | 7/2000 | Toyomura et al. |
| 6,111,189 A | 8/2000 | Garvison et al. |
| 6,182,404 B1 | 2/2001 | Rinklake et al. |
| 6,245,987 B1 | 6/2001 | Shiomi et al. |
| 6,311,436 B1 | 11/2001 | Mimura et al. |
| 6,323,478 B1 | 11/2001 | Fujisaki et al. |
| 6,498,289 B1 | 12/2002 | Mori et al. |
| 6,606,830 B2 | 8/2003 | Nagao et al. |
| 6,617,507 B2 | 9/2003 | Mapes et al. |
| 6,636,185 B1 | 10/2003 | Spitzer et al. |
| 6,921,578 B2 | 7/2005 | Tsujino et al. |
| 6,928,775 B2 | 8/2005 | Banister |
| 7,681,363 B2 * | 3/2010 | Banister .................. 52/173.3 |
| 2002/0043277 A1 | 4/2002 | Yamawaki |
| 2003/0140961 A1 | 7/2003 | Damson et al. |
| 2003/0189823 A1 | 10/2003 | George et al. |
| 2003/0217768 A1 | 11/2003 | Guha |
| 2003/0224506 A1 | 12/2003 | Agrawal et al. |
| 2004/0000334 A1 | 1/2004 | Ressler |
| 2005/0072458 A1 | 4/2005 | Goldstein |

FOREIGN PATENT DOCUMENTS

| | | |
|---|---|---|
| EP | 0867946 | 9/1998 |
| EP | 0917209 | 5/1999 |
| EP | 1201842 | 5/2002 |
| WO | WO 98/13883 | 4/1998 |

\* cited by examiner

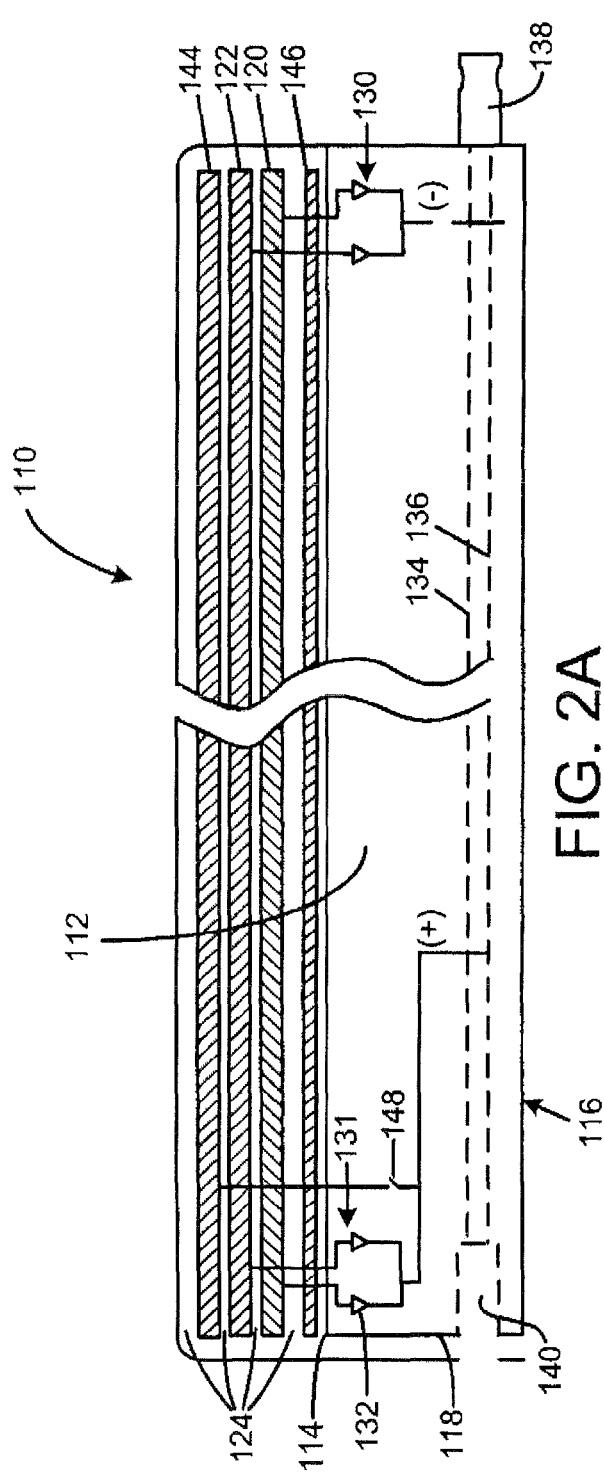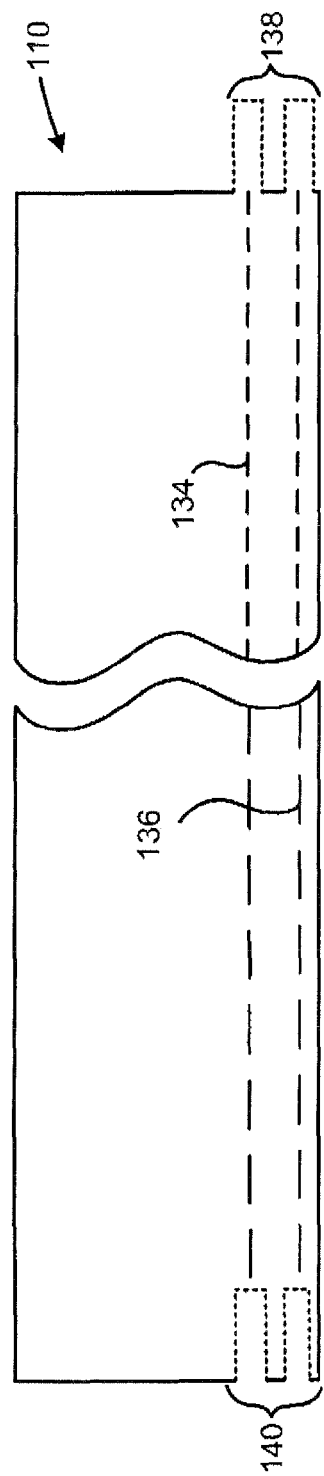
FIG. 2A
FIG. 2B

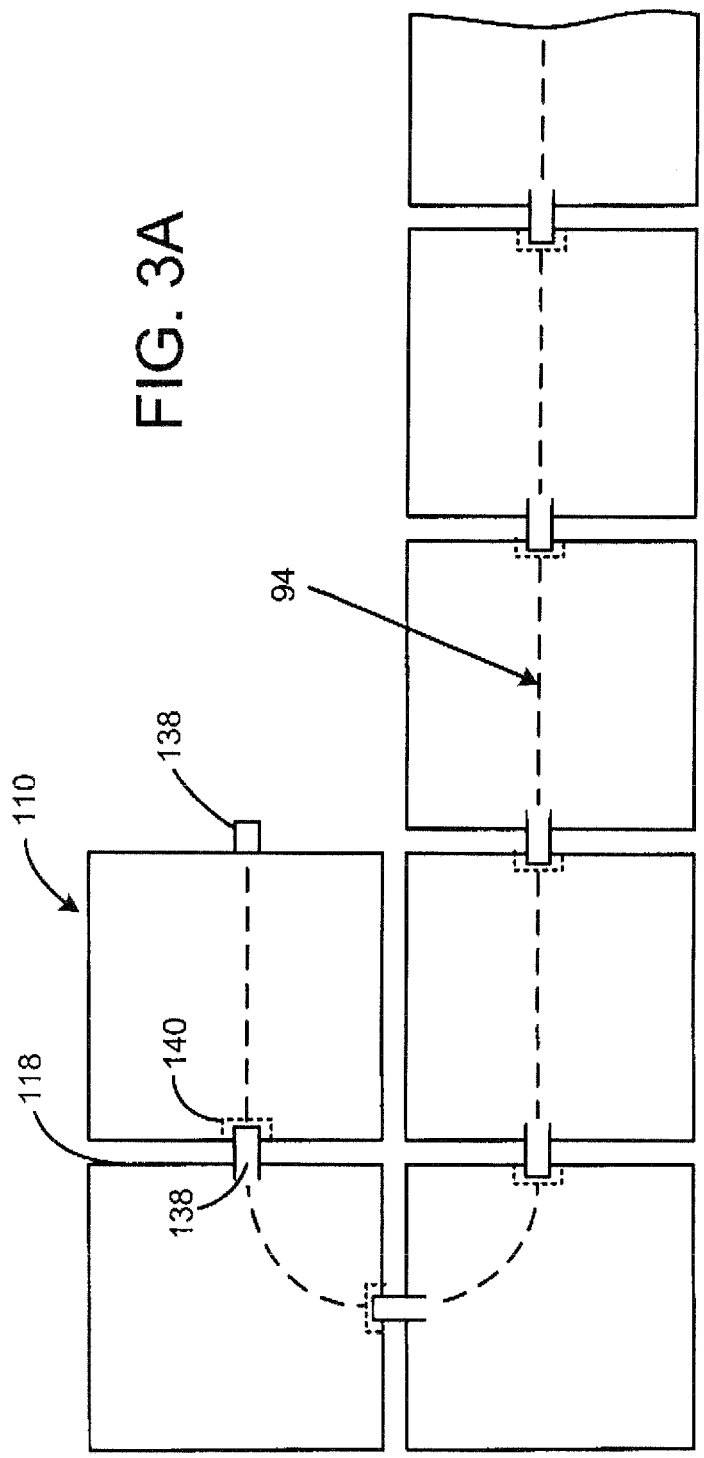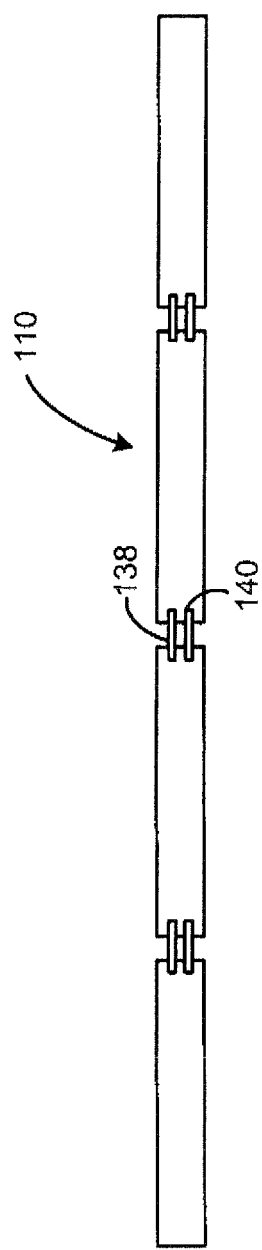

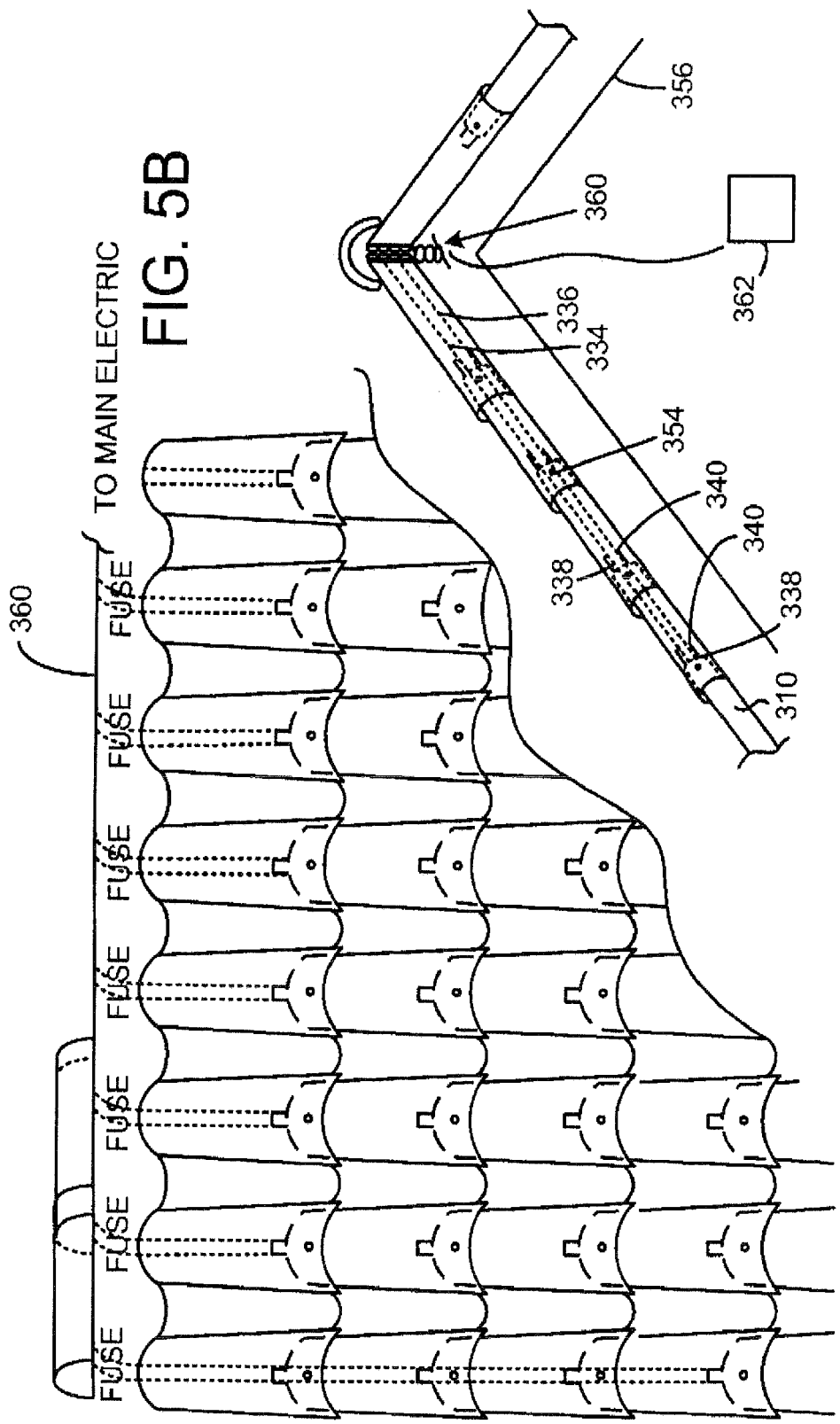

ELECTRIC TILE MODULES

CROSS-REFERENCE TO RELATED APPLICATION

This application claims priority to and is a divisional of U.S. patent application Ser. No. 11/196,012, filed Aug. 3, 2005, now U.S. Pat. No. 7,578,102, which is, in turn a CIP of U.S. patent application Ser. No. 10/222,483 filed Aug. 16, 2002, now U.S. Pat. No. 6,928,775, the contents of which are entirely incorporated herein by reference.

FIELD OF THE INVENTION

The invention generally relates to tiles for wall, roof and floor applications More particularly, the invention relates to connectable tile modules that include electrical components.

BACKGROUND OF THE INVENTION

Providing electricity through photovoltaic and thermovoltaic cells is becoming more popular as these technologies have come down in cost and reliance on other sources of electric power is increasingly disfavored for environmental and strategic reasons. However, providing a general use tile with electrical components that is easy to install and electrically connectable to other tiles without external wiring has been elusive.

The conversion of electromagnetic radiation from thermal sources to electricity is known as thermophotovoltaic ("TPV") power generation. While the overall thermal-to-electric conversion ("TEC") efficiency of TPV systems has typically been lower than hoped for, recent developments in materials and techniques have changed the situation dramatically. Several rare earth oxides, for example, have been shown to alter spectral distributions in their emission spectra, leading to a more efficient TPV operation. For example, GaAs, GaSb, InGaAs are used in thermoelectric applications.

Photovoltaics refer to cells that convert sunlight directly into electrical energy. The electricity is direct current and can be used that way, converted to alternating current through the use of an inverter, or stored for later use in a battery. Conceptually, in its simplest form, a photovoltaic device is a solar-powered battery whose only consumable is light. Because sunlight is universally available, photovoltaic devices have many advantages over traditional power sources. Photovoltaic systems are modular and their electrical power output can be engineered for virtually any application. Moreover, incremental power additions are easily accommodated in photovoltaic systems, unlike more conventional approaches such as fossil or nuclear fuel, which require multi-megawatt plants to be economically feasible.

Although photovoltaic (PV) cells come in a variety of forms, the most common structure is a semiconductor material into which a large-area diode, or p-n junction, has been formed. In terms of basic function, electrical current is taken from the device through a contact structure on the front that allows the sunlight to enter the solar cell and a contact on the back that completes the circuit.

The original and still the most common semi-conducting material used in PV cells is single crystal silicon. Single crystal silicon cells are generally the most efficient type of PV cells, converting up to 23% of incoming solar energy into electricity. These cells are also very durable and have proven their long life in many space related applications. The main problem with single crystal silicon cells is their production costs. Growing large crystals of silicon and then cutting them into thin (0.1-0.3 mm) wafers is slow and expensive. For this reason, researchers have developed several alternatives to single crystal silicon cells, with hopes of reducing manufacturing costs.

Alternatives to single crystal silicon cells include poly-crystalline silicon cells, a variety of "thin film" PV cells, and concentrating collectors. Poly-crystalline silicon cells are less expensive to manufacture because they do not require the growth of large crystals. Unfortunately they are less efficient than single crystal cells (15-17%). "Thin films" (0.001-0.002 mm thick) of "amorphous" or uncrystallized silicon are another PV cell alternative. These thin films are inexpensive, and may be easily deposited on materials such as glass and metal, thus lending themselves to mass production. Amorphous silicon thin film PV cells are widely used in commercial electronics, powering watches and calculators. The problem with these cells is that they are not very efficient (12% in the lab, 7% for commercial cells), and they degrade with time, losing up to 50% of their efficiency with exposure to sunlight.

Thin film PV cells made from other materials have also been developed in an attempt to overcome the inefficiency and degradation of amorphous silicon thin films, while retaining low production costs. Gallium arsenide (GaAs), copper indium diselenide ($CuInSe_2$), cadmium telluride (CdTe) and titanium dioxide ($TiO_2$) have all been used as thin film PV cells, with various efficiencies and production costs. Titanium dioxide thin films, just recently developed, are very interesting because they are transparent and can be used as windows.

In terms of artistic and practical applications (e.g. improved nighttime visibility), electroluminescent materials have become popular novelties. Electroluminescent materials, such as phosphor, emit light when a current is passed through it. Commercially available phosphor-based electroluminescent materials use, for example, zinc sulphide doped with manganese (ZnS:Mn) as amber-glowing phosphor. Making different-color luminescing material for artistic effect is a matter of blending elements that will electroluminesce with red, green, blue (or a combination of these to make light of many different colors). For example, strontium sulphide doped with copper, denoted 'SrS:Cu' can be "tuned" by controlling the proportions of five-neighbored and six-neighbored copper by adding the elements sodium and yttrium to the material, tipping light emission toward the greens.

Thus, a heretofore unaddressed need exists in the industry to address the aforementioned deficiencies and inadequacies.

SUMMARY OF THE INVENTION

Embodiments of the present invention provide an apparatus and method for providing electric tile modules. Briefly described, in architecture, one embodiment of the system, among others, can be implemented as follows. The apparatus is an electrically connectable tile module. The electrically connectable tile module includes a porous substrate having a top side, a bottom side, and at least two side edges. At least one connector is integrated into the porous substrate allowing adjoining electrically connectable tile modules to be electrically connected to the porous substrate. At least one electrical element is disposed over the top side of the porous substrate and electrically connected to the at least one connector.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A is a cross-sectional side view of an electrically connectable tile module with electrical components drawn in schematic form, in accordance with a second exemplary embodiment of the invention.

FIG. 2B is a bottom view of the electrically connectable tile module of FIG. 2A, in accordance with the second exemplary embodiment of the invention.

FIG. 3A is a top view of a plurality of interlocked electrically connectable tile modules of FIG. 2A, in accordance with the second exemplary embodiment of the invention.

FIG. 3B is a side view of the plurality of interlocked electrically connectable tile modules of FIG. 3A, in accordance with the second exemplary embodiment of the invention.

FIG. 5A is a side view of a plurality of interlocked electrically connectable tile modules, in accordance with a fourth exemplary embodiment of the invention.

FIG. 5B is a top view of a plurality of the interlocked electrically connectable tile modules of FIG. 5A, in accordance with the fourth exemplary embodiment of the invention.

DETAILED DESCRIPTION OF THE INVENTION

Figure 1:
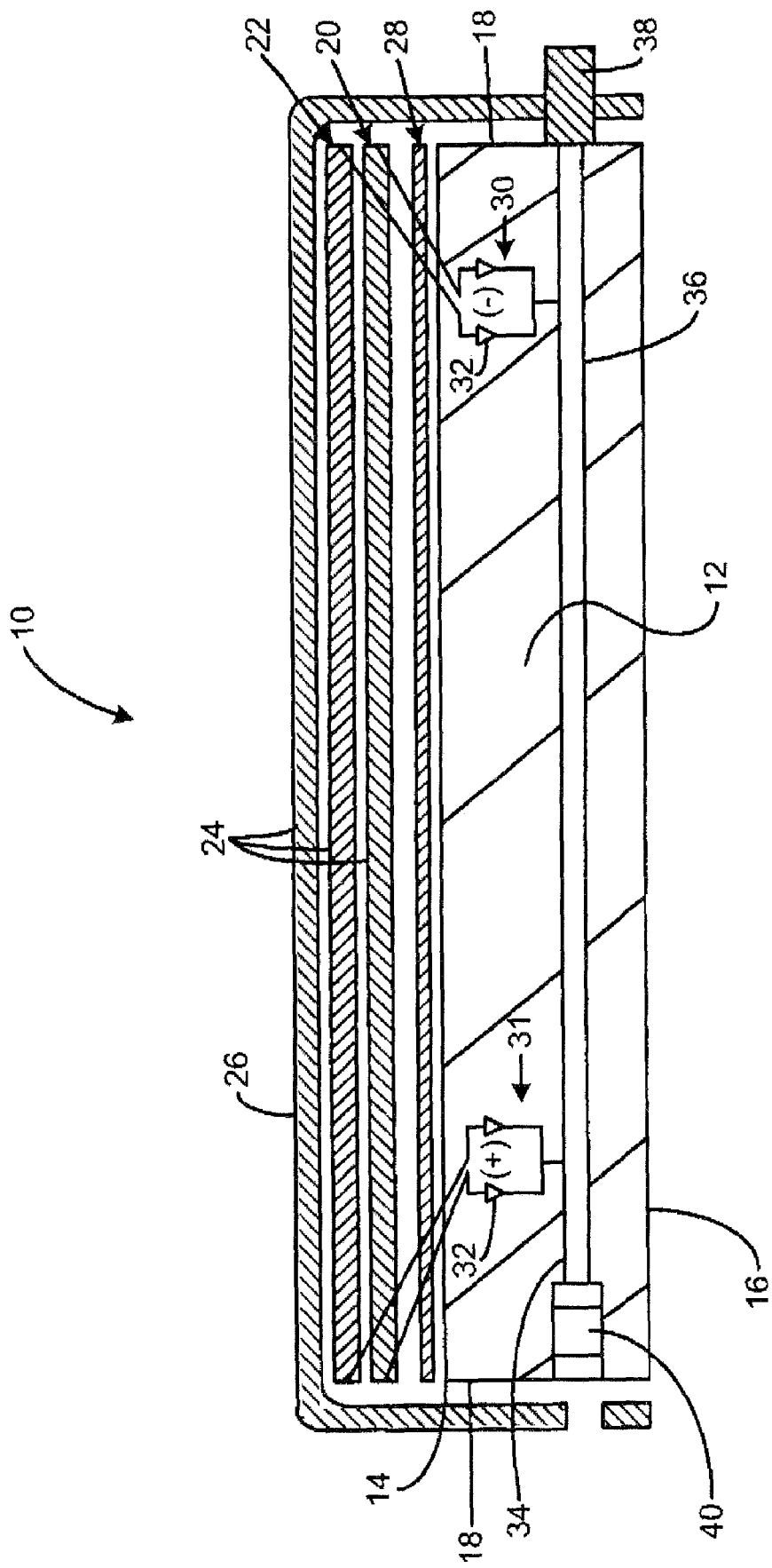
FIG. 1 is a cross-sectional side view of an electrically connectable tile module with electrical components drawn in schematic form, in accordance with a first exemplary embodiment of the invention.

The invention, in general, provides an electrically connectable tile module 10. FIG. 1 is a cross-sectional side view of the electrically connectable tile module 10 with electrical components drawn in schematic form, in accordance with a first exemplary embodiment of the invention. The electrically connectable tile module 10 includes a rigid substrate 12. The rigid substrate 12 may include ceramic, cement, or other rigid materials, including, but not limited to, clay, mud, polymers such as a plastic, polymer/clay or polymer/ceramic hybrids, or glass. The rigid substrate 12 may be composed of an electrically insulating material to prevent short circuits among connected tiles modules. Rigid substrate 12 includes a top side 14, a bottom side 16, and side edges 18. Although a substantially rectangular cross-sectional shape for the rigid substrate 12 is shown, it should be understood that the tile modules may assume any shape having top and bottom sides 14, 16 and one (e.g., circles) or more side edges 18 (e.g., triangles, squares, hexagons).

A thermovoltaic element 20 and a photovoltaic element 22 (collectively, the "voltaic elements 20, 22") may be disposed over the top side 14. The term "thermovoltaic" encompasses all known materials that operate to convert heat into electricity, including, but not limited to, mercury cadmium telluride thermal diodes. The voltaic elements 20, 22 may be thin film thermovoltaic and photovoltaic cells. The term "thin film" is herein defined as micron-sized material deposited as an element over another material. Thin films are relatively inexpensive and may be easily deposited on many different rigid materials by several different methods well known to those having ordinary skill in the art. For example vacuum deposition, ion sputtering, spin-coating are deposition methods that may be used to apply the voltaic elements 20, 22.

Voltaic elements 20, 22 may be coated with a transparent, electrically insulating material 24, such as silicon. Also, the electrically connectable tile module 10 may be coated with a sealing layer 26. The sealing layer 26 is designed to make the electrically connectable tile module 10 wear and weather resistant. The sealing layer 26 may include, but is not limited to, fired ceramic glazes, liquid glazes, sol gels, polymer or glass-based coatings, thick films, or a combination of these. To enhance the productivity of the thermovoltaic element 20, a heat-reflective element 28 may be disposed on the top side 14 of the rigid substrate 12 and underneath thermovoltaic element 20. Optionally, the sealing layer 26 may include a light-enhancing product, such as micro industrial diamonds (not shown) to enhance productiveness of the photovoltaic element 22.

Many variations exist on the type and placement of electrical wiring and components of each electrically connectable tile module 10. As illustrated in the first exemplary embodiment in FIG. 1, a first circuit segment 30, which has a negative polarity, and a second circuit segment 31, which has a positive polarity, both contain diodes 32 to prevent a backflow of electricity in the event of a voltage differential between voltaic elements 20, 22. Hence, current produced from the voltaic elements 20, 22 flows along a first wire 34, connected to the first circuit segment 30, and a second wire 36, connected to the second circuit segment 31. The first and second wires 34, 36 may be run through channels (see FIG. 6A) in rigid substrate 12 or sealed to bottom side 16. The first and second wires 34, 36 may terminate at a male connector 38 and a female connector 40. As shown in FIG. 1, male and female connectors 38, 40 may be disposed along opposing side edges 18. However, a corner tile module could have connectors extending from perpendicular side edges. This configuration is suited for wall and floor applications of the electrically connectable tile module 10 because it allows interconnection without the need for complex wiring or installation problems associated with loose wires in mortar or grout.

FIG. 2A is a cross-sectional side view of an electrically connectable tile module 110 with electrical components drawn in schematic form, in accordance with a second exemplary embodiment of the invention. Electrically connectable tile module 110 includes a rigid substrate 112 with a top side 114, bottom side 116, and opposing side edges 118. Disposed over top side 112 are thermovoltaic element 120, photovoltaic element 122, and electroluminescent element 144. The electroluminescent element 144 is composed of an electroluminescent material, such as phosphor material, that emits light when a current is passed through it. Optionally, a reflective element 146 is disposed between the thermovoltaic element 120 and the top side 114.

The voltaic elements 120, 122 and the electroluminescent element 144 may be separated by a transparent, electrically insulating material (e.g. silicon), which may also act as a sealing layer 126. In terms of electrical connections, one of many possible arrangements is represented by first circuit segment 130 and second circuit segment 131. First circuit segment 130 has a negative polarity, while second circuit segment 131 has a positive polarity, with both circuits 130, 131 containing diodes 132 to prevent backflow of electricity in the event of a voltage differential between the voltaic elements 120, 122 and the electroluminescent element 144. The electricity produced from the voltaic elements 120, 122 flows to a first wire 134 and a second wire 136 (shown in phantom line). The wires 134, 136 lead to a male connector 138 and a female connector 140. As shown, the connectors 138, 140 protrude from opposing side edges 118. Also, a switch 148 may control the flow of electricity to the electroluminescent element 144.

FIG. 2B is a bottom view of the electrically connectable tile module 110 of FIG. 2A, in accordance with the second exemplary embodiment of the invention. The bottom view illustrates, as in this exemplary embodiment, the male connector 138 may have more than one prong.

FIG. 3A is a top view of a plurality of interlocked electrically connectable tile modules 110 of FIG. 2A, in accordance with the second exemplary embodiment of the invention. FIG. 3B is a side view of the plurality of interlocked electrically connectable tile modules 110 of FIG. 3A, in accordance with the second exemplary embodiment of the invention. Electrically connectable tile modules 110 are connected along a side edge 118 by engagement of the male connector 138 to the female connector 140. Thus, a path 94 for the flow of current is established between the electrically connectable tile modules 110.

Figure 4:
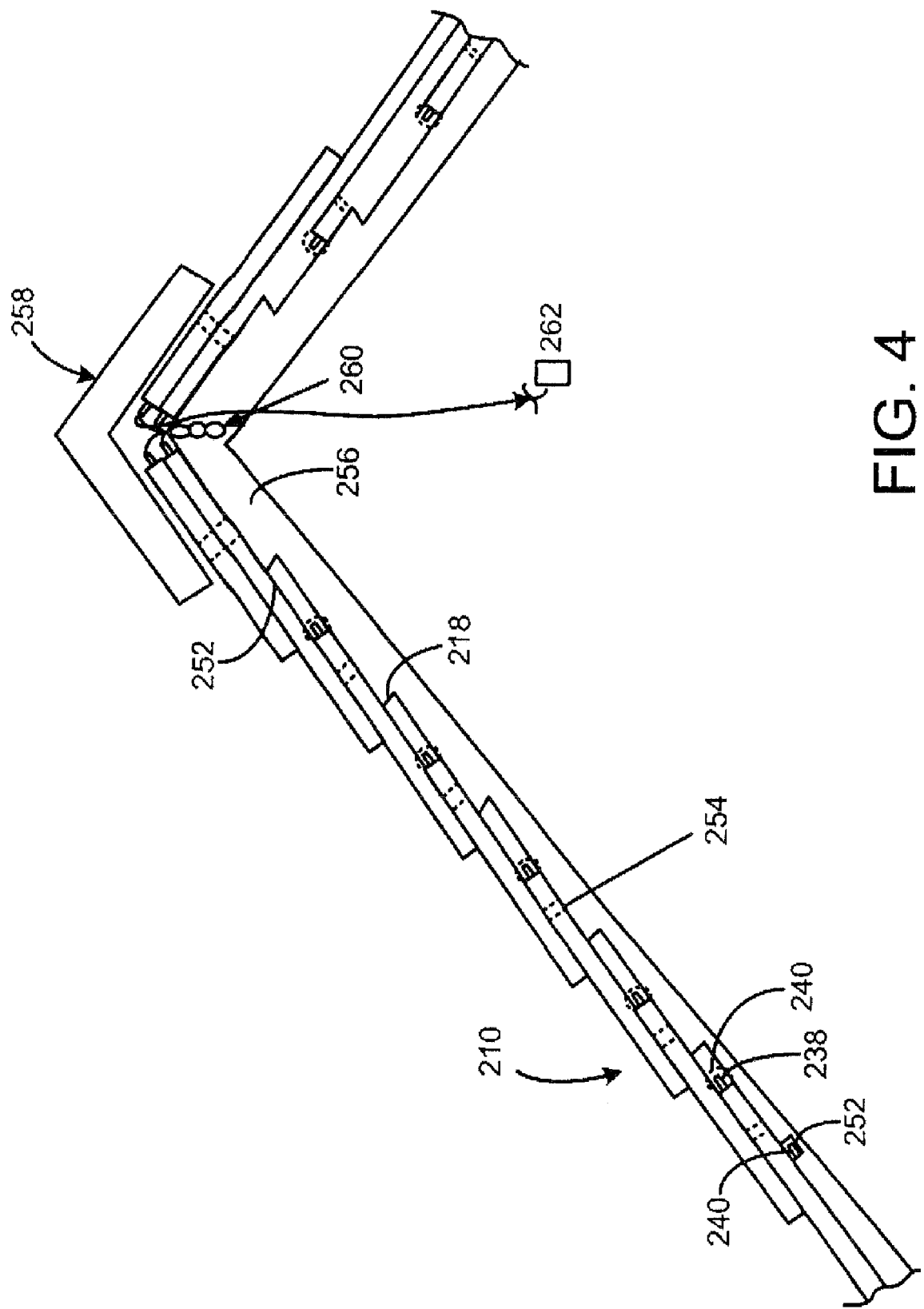
FIG. 4 is a side view of a plurality of interlocked electrically connectable tile modules, in accordance with a third exemplary embodiment of the invention.

FIG. 4 is a side view of a plurality of interlocked electrically connectable tile modules 210, in accordance with a third exemplary embodiment of the invention. Electrically connectable tile modules 210 are made so that a bottom tab 252 houses a connector (in this case a female connector 240) such that frictional engagement of a male connector 238 can be made along a side edge 218 of an adjoining electrically connectable tile module 210. Preformed holes 254 allow each electrically connectable tile module 210 to be attached by a nail or screw to a roof substructure 256, if desired. The apex of the pictured roof is preferably covered with a cap piece 258. The connectors 238, 240 in the upper most electrically connectable tile module 210 may be connected to a battery, main electrical service 262, or other load by backbone wires 260. It should be noted that the third exemplary embodiment, and any embodiment in which the electrically connectable tile modules 210 convert energy into electrical power can be electrically connected to any power-saving, power-consuming, or power-converting apparatus and all such uses are considered to be within the scope of this invention.

One possible embellishment on the tabs 252 is the tabs 252 may be spring connectors, such that when one electrically connectable tile module 210 for a roof is slid at least partially under another electrically connectable tile module 210, a spring-loaded tab 252 must be depressed on one of the electrically connectable tile module 210. When the electrically connectable tile module 210 is properly slid into position, the depressed tab 252 extends into the other electrically connectable tile module 210, interlocking the two electrically connectable tile modules 210.

FIG. 5A is a side view of a plurality of interlocked electrically connectable tile modules 310, in accordance with a fourth exemplary embodiment of the invention. FIG. 5B is a top view of a plurality of the interlocked electrically connectable tile modules 310 of FIG. 5A, in accordance with the fourth exemplary embodiment of the invention. The electrically connectable tile modules 310 are mounted on a roof substructure 356 and are interconnected by a male connector 338 coupled to a female connector 340. Each electrically connectable tile module 310 may include a preformed hole 354 to facilitate attachment to the roof substructure 356. Wires 334, 336 then transmit electricity to a battery, main electrical service 362, or other load by backbone wires 360.

Figure 6A:
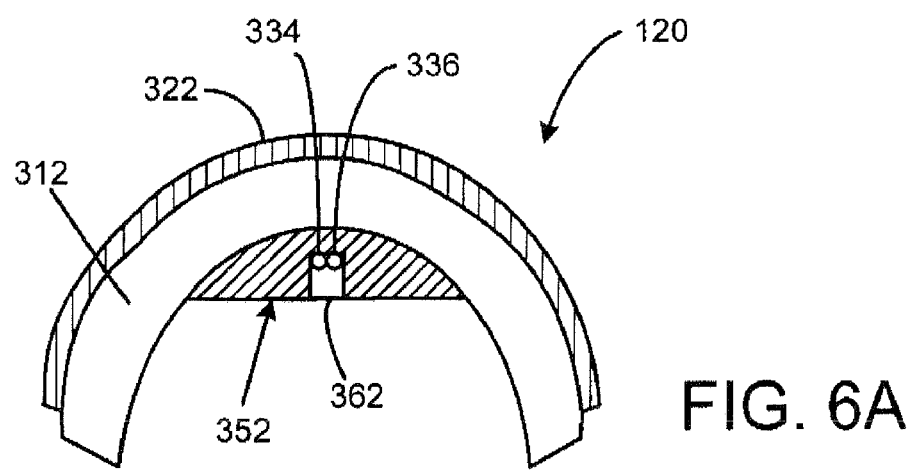
FIG. 6A is an end view of one of the electrically connectable tile modules shown in FIG. 5A, in accordance with the fourth exemplary embodiment of the invention.
Figure 6B:
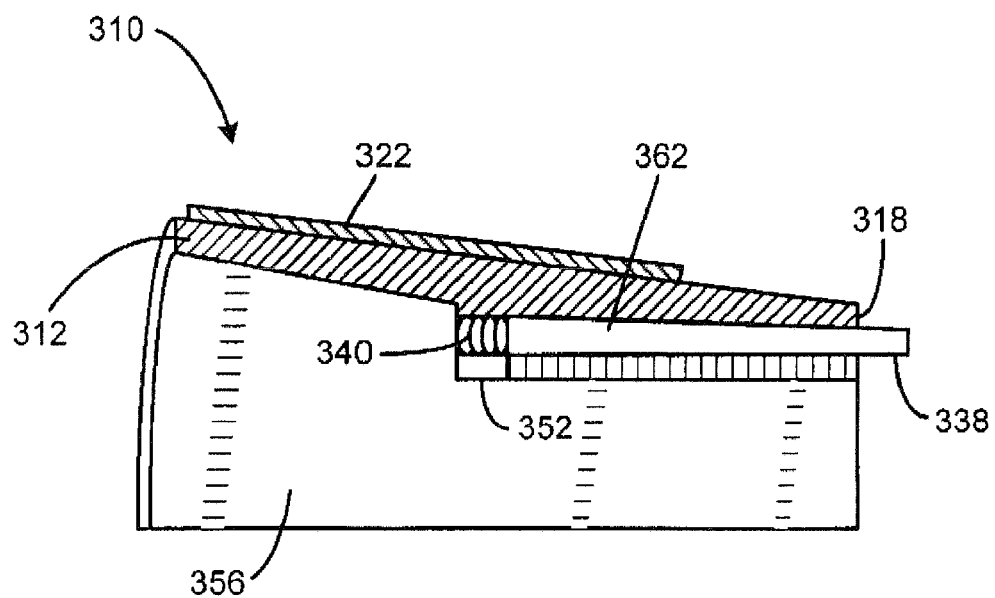
FIG. 6B is a side view of a portion of one of the electrically connectable tile modules shown in FIG. 5A, in accordance with the fourth exemplary embodiment of the invention.

FIG. 6A is an end view of one of the electrically connectable tile modules 310 shown in FIG. 5A, in accordance with the fourth exemplary embodiment of the invention. FIG. 6B is a side view of a portion of one of the electrically connectable tile modules 310 shown in FIG. 5A, in accordance with the fourth exemplary embodiment of the invention. Electrically connectable tile module 310 has a photovoltaic element 322 disposed over the top of rigid substrate 312. On the bottom of rigid substrate 312, a tab 352 houses channel 362 and wires 334, 336. Male connector 338 is disposed at side edge 318 while female connector 340 is located within tab 352.

Figure 7:
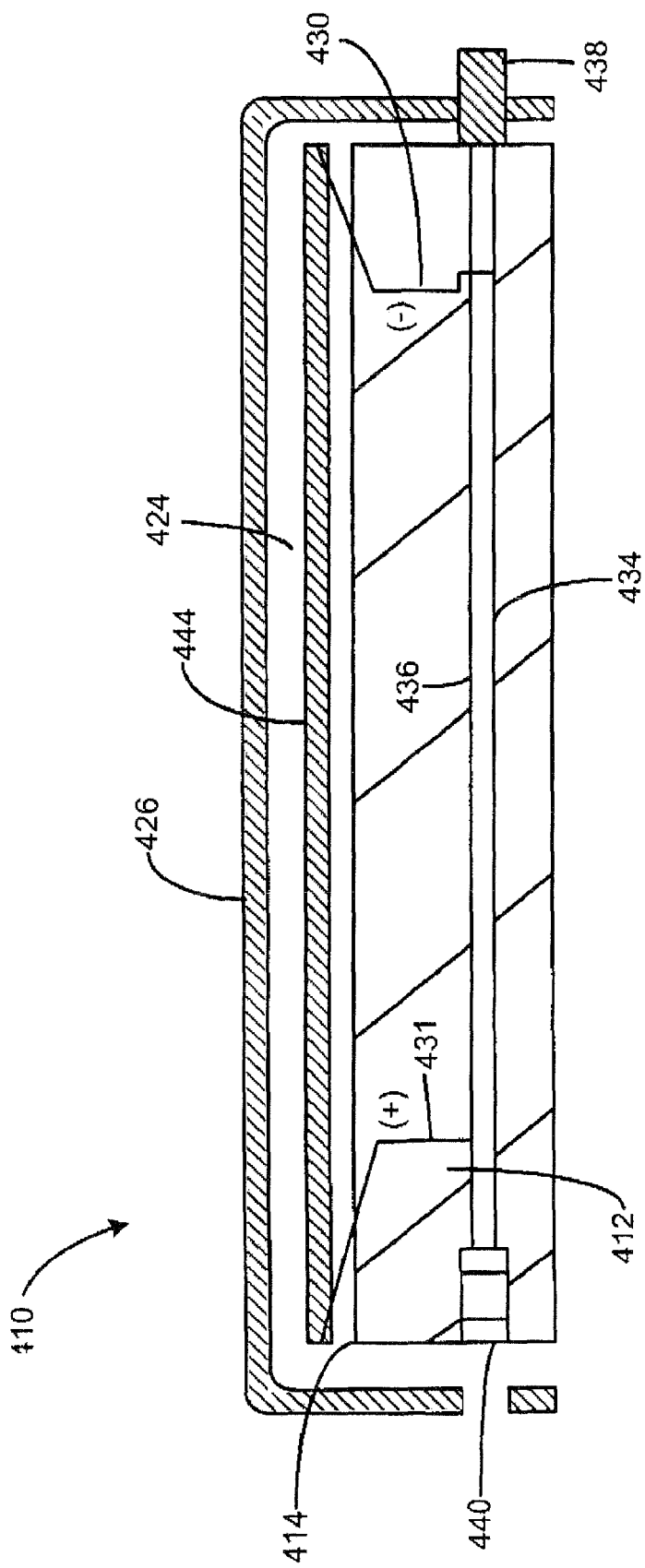
FIG. 7 is a cross-sectional side view of an electrically connectable tile module, in accordance with a fifth exemplary embodiment of the invention.

FIG. 7 is a cross-sectional side view of an electrically connectable tile module, in accordance with a fifth exemplary embodiment of the invention. Electrically connectable tile module 410 is made up of rigid substrate 412, having a top side 414. Disposed over top side 414 is electroluminescent element 444. Electrically insulating element 424 and sealing layer 426 coat the electroluminescent element 444 and rigid substrate 412 as described in previous embodiments. Sealing layer 426 is connected between from a negatively charged wire 430 and a positively charged wire 431, which are connected to a first wire 434 and a second wire 436. Two connectors 438, 440 allow the electrically connectable tile module 410 to conduct current from an adjoining tile. Of course, designs, letters, or shapes may be made with the electroluminescent element 444 to add a creative element to the electrically connectable tile module 410.

It should be noted that the manufacture of the invention may be accomplished using conventional manufacturing methods. For example, rigid substrate material can be cast or molded and then cured or fired. Circuitry and connecting material is then applied at different points as one or more electric component elements (photovoltaic, thermovoltaic, and/or electroluminescent) are deposed over the rigid substrate. If thin films are used, these films can be deposited on a reflector material (most likely stainless steel) and then laminated to the substrate, or a thin film can be deposited directly on the substrate. At this point, the various sealing coatings or glazes would be applied to the tile, which could then be cured or fired as necessary. Other electric components, such as a battery, inverter, or connectors, would then be installed to complete the tile.

Figure 8:
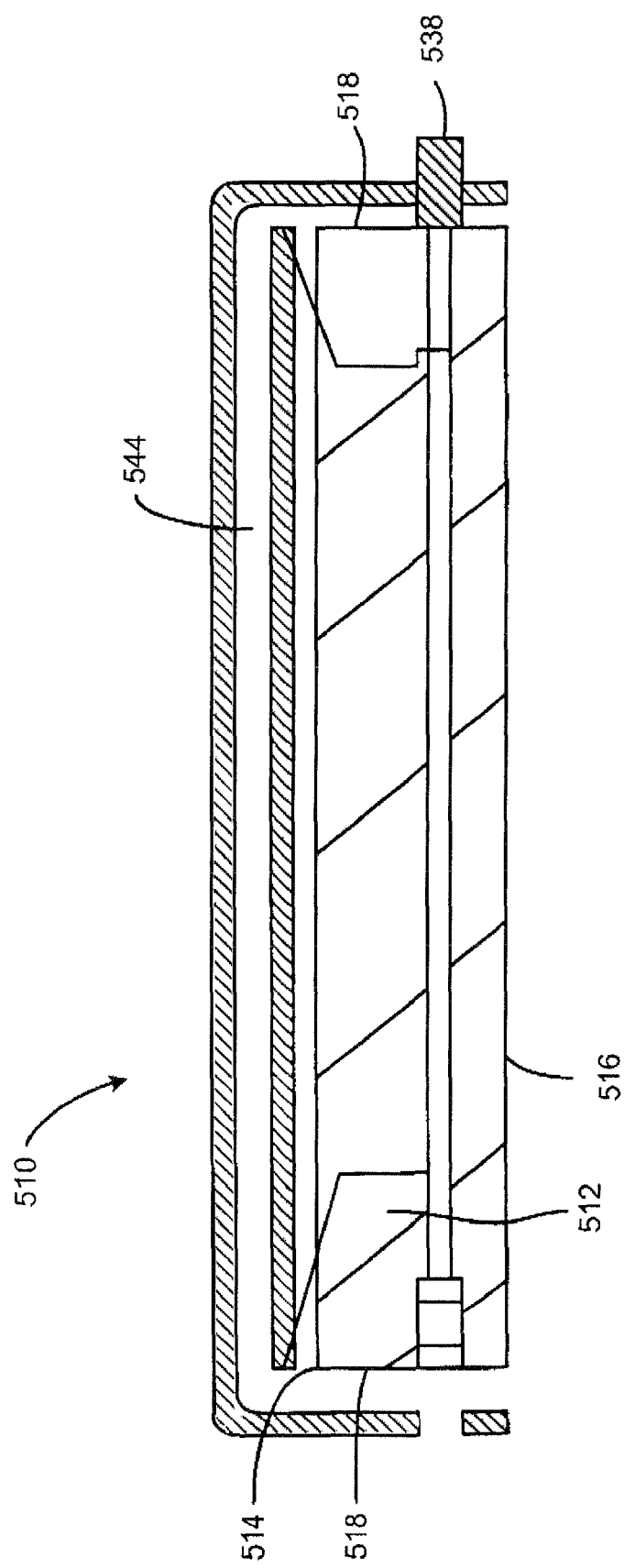
FIG. 8 is a cross-sectional side view of an electrically connectable tile module, in accordance with a sixth exemplary embodiment of the invention.

FIG. 8 is a cross-sectional side view of an electrically connectable tile module 510, in accordance with a sixth exemplary embodiment of the invention. The electrically connectable tile module 510 includes a porous substrate 512 having a top side 514, a bottom side 516, and at least two side edges 518. At least one connector 538 is integrated into the porous substrate 512. The connector 538 allows the porous substrate 512 to be electrically connected to adjoining electrically connectable tile modules. At least one electrical element is disposed over the top side 514 of the porous substrate 512 and electrically connected to the at least one connector 538. As shown in FIG. 8, the electrical element may be an electroluminescent element 544.

Forming substrate 512 of a porous material provides several advantages. For one, forming substrate 512 of porous material results in a module 510 that is relatively lightweight as compared to one made from a solid substrate material, and yet retains structural integrity. The porous substrate 512 also has less thermal mass, and may cool more easily. As a result, the electrical element(s) may operate more efficiently if the porous substrate 512 is kept relatively cool. The porous substrate 512 may be rigid or flexible. The porous substrate 512 may include metal, ceramic, polymer, a composite material, or another commercially available material. One preferred material is a GPM porous ceramic available from Porvair Advanced Materials of Hendersonville, N.C. who provide porous rigid ceramic materials having densities ranging to as low as 10-30%. Other preferred materials include flexible porous plastic sheet materials, and the like available from Micro Pore Plastics, Inc. of Tucker, Ga. However, other porous materials having densities ranging from about 10-80% or more advantageously may be used in accordance with the present invention.

Figure 9:
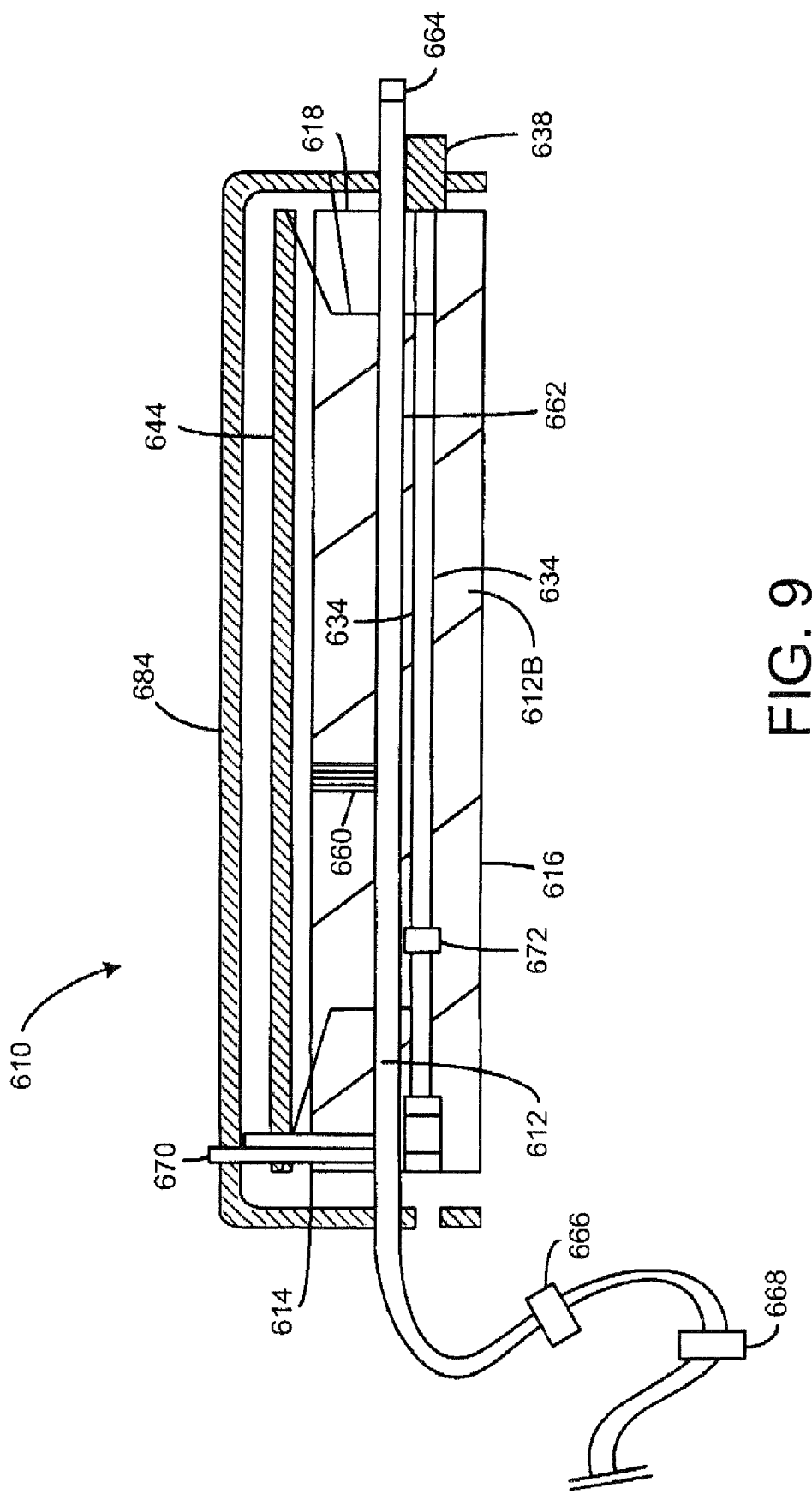
FIG. 9 is a cross-sectional side view of an electrically connectable tile module, in accordance with a seventh exemplary embodiment of the invention.

FIG. 9 is a cross-sectional side view of an electrically connectable tile module 610, in accordance with a seventh exemplary embodiment of the invention. The electrically connectable tile module 610 includes a porous substrate 612 having a top side 614, a bottom side 616, and at least two side edges 618. At least one connector 638 is integrated into the porous substrate 612. The connector 638 allows the porous substrate 612 to be electrically connected to adjoining electrically connectable tile modules. At least one electrical element is disposed over the top side 614 of the porous substrate 612 and electrically connected to the at least one connector 638. As shown in FIG. 9, the electrical element may be an electroluminescent element 644.

As shown in FIG. 9, the electrically connectable tile module 610 may also include a heat sink 660 integrated with the electrical element, the electroluminescent element 644. The heat sink 660 also, or instead, may be integrated with the porous substrate 612. The electrically connectable tile module 610 may also include at least one conductor 634 connected to the at least one connector 638 and integral with the porous substrate 612.

As shown in FIG. 9, the electrically connectable tile module 610 may also include a fluid system. The fluid system includes at least one fluid conduit 662 integral with the porous substrate 612. At least one fluid connector 664 is integral with the fluid conduit 662. The fluid connector 664 allows adjoining electrically connectable tile modules having adjoining fluid conduits to fluidly connect to the porous substrate 612. The fluid system may also include a pump 666 in fluid communication with the fluid conduit 662. The pump 666 may be capable of circulating fluid through the fluid conduit 662. Also, the heat sink 660 may be in thermal communication with the fluid conduit 662 and/or in thermal communication between the fluid conduit 662 and the electrical element. The heat sink 660 may operate to enhance heat transfer with a fluid in the fluid conduit 662 and one purpose of the fluid conduit may be to allow heat transfer to and from the electrically connectable tile module 610. A storage tank 668 may be provided in fluid communication with the fluid conduit 662. The storage tank 668 may operate to store heated fluid, which may be transported therefrom for other applications.

A wetting surfactant 684 may be applied to an outer surface of the electrically connectable tile module 610. The wetting surfactant 684 may make cleaning the electrically connectable tile modules 610 less difficult. The wetting surfactant 684 may be fluid contained within the fluid conduit 662 and may be applied to the outer surface of the electrically connectable tile module 610 intermittently and/or as desired. Release of the wetting surfactant 684 from the fluid conduit 662 may be controlled by a sensor 670. The sensor 670 may be designed to sense an at least partial build up of dirt, dust, or similar debris and initiate release of the wetting surfactant 684, which may then cause the dust, dirt, and debris to be removed.

The porous substrate 612 may allow the electrically connectable tile module 610 to be more lightweight. The porous substrate 612 may also be thermally conductive, allowing it to cool more easily while retaining structure and mass for support of the electrical element(s). The electrical element(s) may operate more efficiently if the porous substrate 612 can remain relatively cool. A nonporous substrate 612B may be attached to the porous substrate 612. The nonporous substrate 612B may be able to provide some mechanical advantages, such as impeding water penetration as a roofing tile, which may not be provided by the porous substrate 612. The porous substrate 612 may be integral with a mechanical connector 672 to facilitate connection to a nonporous substrate 612B or other material.

In use, the porous substrate 612 may be mounted to a floor, a wall, a roof, a ceiling, or other surface. While use of the electrically connectable tile module 610 is discussed in relation to mounting on surfaces of residential or commercial buildings, the electrically connectable tile module 610 may also be mounted within pools, along sidewalks or walkways, and in other conceivable locations without departing from the scope of the invention. The porous substrate 612 may be mounted by adhesive, mechanical attachment, or other means known to one having ordinary skill in the art with tiles and/or porous substrates.

Figure 10:
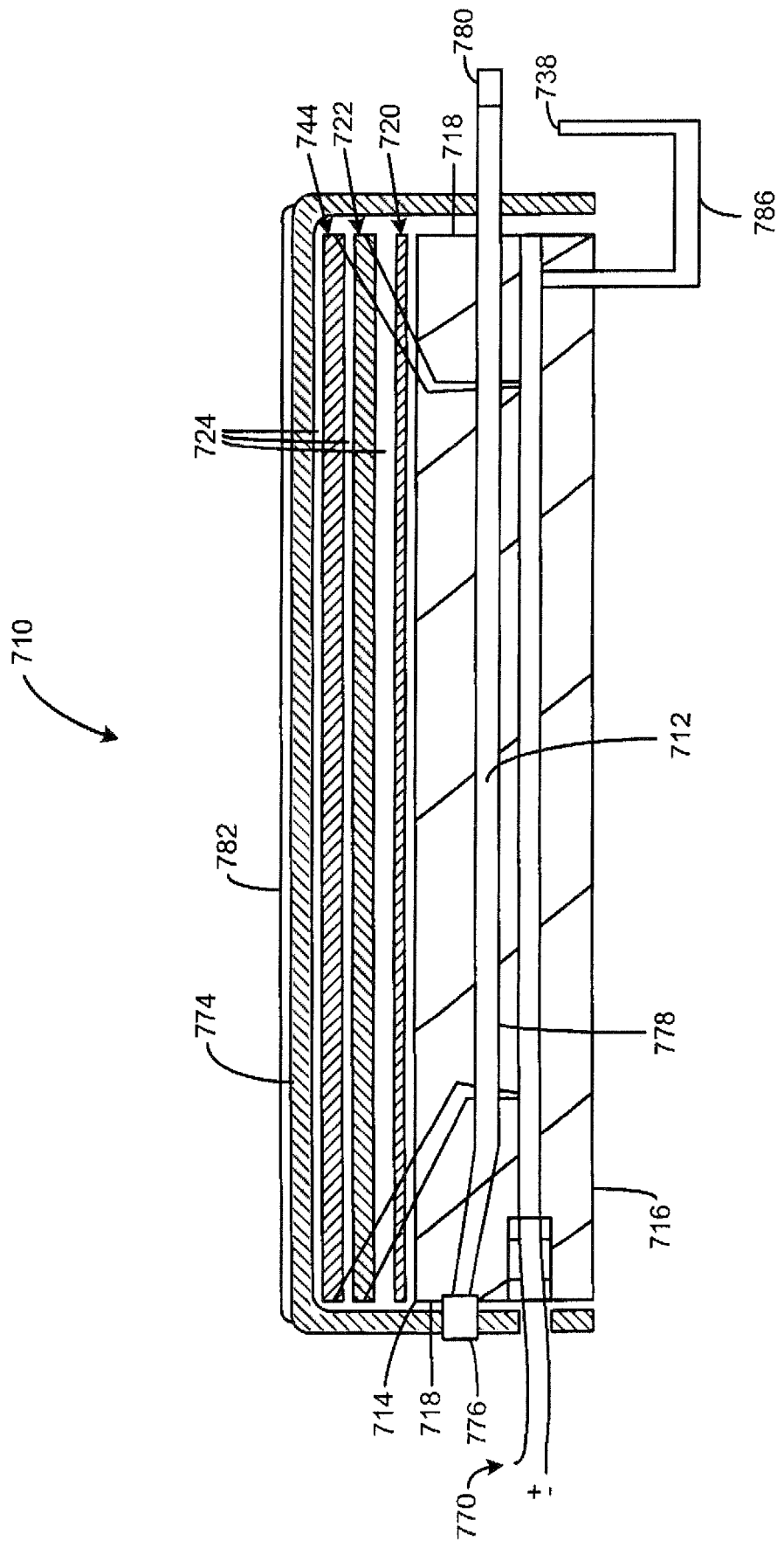
FIG. 10 is a cross-sectional side view of an electrically connectable tile module, in accordance with an eighth exemplary embodiment of the invention.

FIG. 10 is a cross-sectional side view of an electrically connectable tile module 710, in accordance with an eighth exemplary embodiment of the invention. The electrically connectable tile module 710 includes a porous substrate 712 having a top side 714, a bottom side 716, and at least two side edges 718. At least one connector 738 is integrated into the porous substrate 712. The connector 738 allows the porous substrate 712 to be electrically connected to adjoining electrically connectable tile modules. At least one electrical element is disposed over the top side 714 of the porous substrate 712 and electrically connected to the at least one connector 738. As shown in FIG. 8, the electrical element may include an electroluminescent element 744, a thermovoltaic element 720, and a photovoltaic element 722. Electrically insulating element 724 coats the electroluminescent element 744 and rigid substrate 712 as described in previous embodiments.

The electroluminescent element 744, the thermovoltaic element 720, and the photovoltaic element 722 may be interconnected. The thermovoltaic element 720 may convert heat into electricity to power the electroluminescent element 744. This conversion may also operate to cool the electrically connectable tile module 710. Similarly, the photovoltaic element 722 may convert ambient light into electricity to power the electroluminescent element 744. In this regard, the electroluminescent element 744 may not need power from a remote source.

A switch 770 in electrical communication with the electroluminescent element 744 may control the electroluminescent element 744. The switch 770 may be used to control multiple electroluminescent elements 744 disposed over the top sides 714 of multiple porous substrates 712. The switch 770 may be a two-position switch, a three-way switch, a dimmer switch, or another style switch known to those having ordinary skill in the art. The switch 770 may be operated manually, or it may operate, for example, through a timer, an automated control, a sensor, or another type of control known to those having ordinary skill in the art. The switch 770 may operate as a controller, in communication with the thermovoltaic element 720, and/or the photovoltaic element 722 as well as or instead of the electroluminescent element 744 to provide control to those electrical elements.

The electroluminescent element 744 may include a multicolor electroluminescent material. The multi-color electroluminescent material would allow the electroluminescent element 744 to radiate light in multiple colors and, possibly, vary the colors of radiated light. The electroluminescent element 744 may further be capable of radiating electromagnetic waves in wavelengths outside of visible light. For instance, the electroluminescent element 744 may be capable of radiating ultraviolet or infrared wavelengths of electromagnetic energy. The electroluminescent element 744 may include, for example, LEDs, OLEDs, miniature illuminating chips, laser photonics, or other conventional light sources.

The electroluminescent element 744 may include an illuminable screen 774 disposed over the top side 714 of the porous substrate 712 and a radiation source 776 proximate to the porous substrate 712. As shown in FIG. 10, the radiation source 776 may be positioned to radiate at least a portion of the illuminable screen 774. The radiation source 776 may be capable of radiating electromagnetic waves in various wavelengths of visible light as well as wavelengths outside of visible light. For instance, the radiation source 776 may be capable of radiating ultraviolet or infrared wavelengths of electromagnetic energy. The illuminable screen 774 may be capable of propagating at least a portion of the electromagnetic waves radiated from the radiation source 776.

The electrically connectable tile module 710 may also include at least one fiber optic cable 778 integral with the porous substrate 712. The fiber optic cable 778 may be integral with the electroluminescent element 744. The fiber optic cable 778 may be used to illuminate the illuminable screen 774, propagating at least a portion of the electromagnetic waves radiated from the radiation source 776, which may be located remotely with respect to the electrically connectable tile module 710. At least one fiber optic connector 780 may be integral with the fiber optic cable 778, allowing the fiber optic cable 778 to connect to other electrically connectable tile modules having adjoining fiber optic cables. The fiber optic cable 778 may be used to illuminate multiple illuminable screens 774 of multiple electrically connectable tile modules 710, by propagating at least a portion of the electromagnetic waves radiated from one or more radiation sources 776, which may be located remotely with respect to at least some of the electrically connectable tile modules 710.

An oxidizing coating 782 may be applied to an outer surface of one of the electrical elements. The oxidizing coating 782 may be a titanium oxide, such as that disclosed in U.S. Pat. No. 6,809,145 to Okamura, et al. The oxidizing coating 782 may operate as a photocatalyst, exhibiting hydrophilic properties when exposed to ultraviolet light. The hydrophilic properties may result in a thin film of water spreading across the electrically connectable tile module 710, when exposed to water and ultraviolet light, causing dust, dirt, and similar debris to float on the thin film. The dirt may then be easily wiped away. The oxidizing coating 782 may also oxidize air pollutants and other elements that adhere to the electrically connectable tile module 710, in some cases converting the substances to harmless carbon dioxide or otherwise sterilizing the outer surface of the electrical element. The oxidizing coating 782 may react to visible light and some wavelengths of non-visible radiation. The oxidizing coating 782 may react to electromagnetic waves radiated from the electroluminescent element 744. The electroluminescent element 744 may be limited to the purpose of producing electromagnetic waves that cause the oxidizing coating 782 to react.

The switch 770 may include a sensor mounted proximate to the top side 714 of the porous substrate 712. The sensor, in electrical communication with the connector 738, may initiate at least one of the electrical elements. The sensor may be designed to sense an at least partial build up of dirt, dust, or similar debris and initiate the electroluminescent element 744, which may then cause the oxidizing coating 782, causing the dust, dirt, and debris to be removed through oxidation and/or hydrophilic activity.

Figure 11:
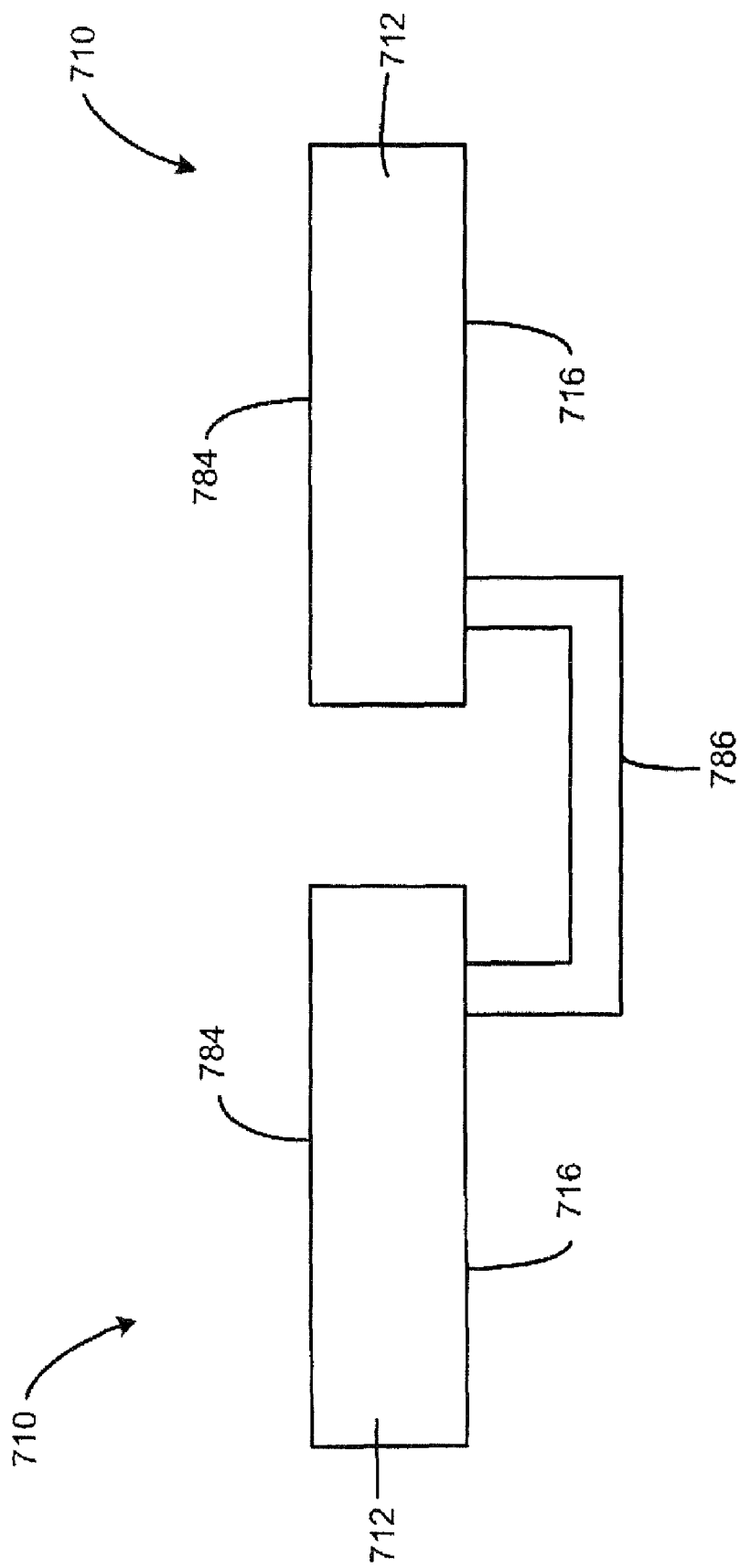
FIG. 11 is a side view of two of the electrically connectable tile modules of FIG. 10, in accordance with the eighth exemplary embodiment of the invention.

FIG. 11 is a side view of two of the electrically connectable tile modules 710 of FIG. 10, in accordance with the eighth exemplary embodiment of the invention. As apparent from the side view of FIG. 11, the connector 738 may include a U-shaped electrical connector 786 integrally connected to the bottom side 716 of the porous substrate 712. The U-shaped electrical connector 786 may permit grout or other substances to be inserted between the electrically connectable tile module 710 with reduced interference. The U-shaped electrical connector 786 may also allow an electrically connectable tile module 710 to be lifted out of place without pulling, or otherwise mechanically straining, the U-shaped electrical connector 786 and or adjacent electrically connectable tile modules 710.

A wetting surfactant 784 may be applied to an outer surface of the electrical element(s). The wetting surfactant 784 may make cleaning the electrically connectable tile modules 710 less difficult.

The electrical elements of electrically connectable tile module 710 may include a display screen. A display screen would allow images to be represented on the electrically connectable tile module 710. Further, multiple display screens contained on electrically connectable tile module 710 could be coordinated to provide a single, coordinated image.

Figure 12:
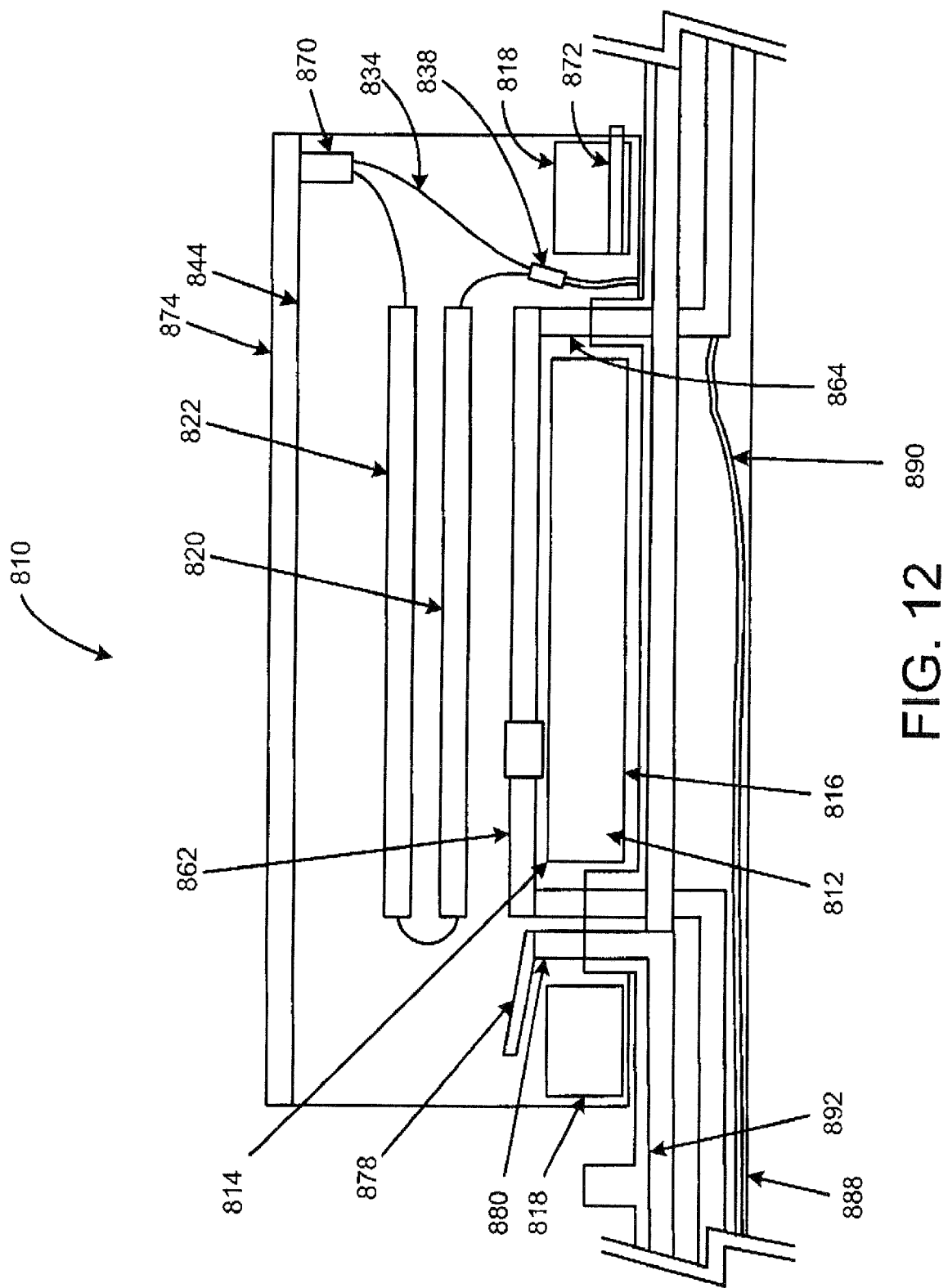
FIG. 12 is a cross-sectional side view of an electrically connectable tile module, in accordance with a ninth exemplary embodiment of the invention.
Figure 12A:
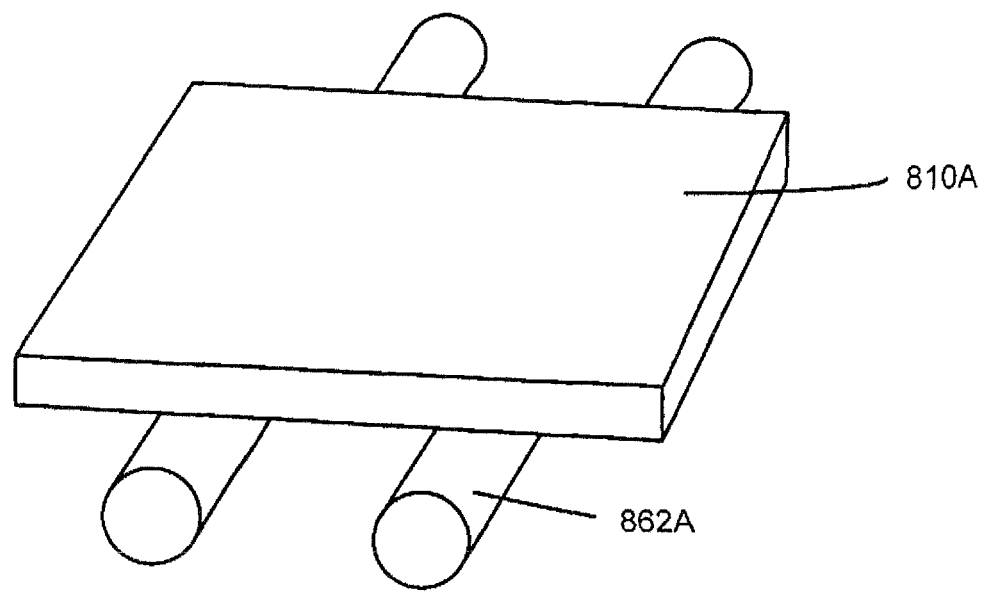
FIGS. 12A and 12B are simplified perspective and cross-sectional views of an electrically connectable tile module, in accordance with a tenth exemplary embodiment of the invention.
Figure 12B:
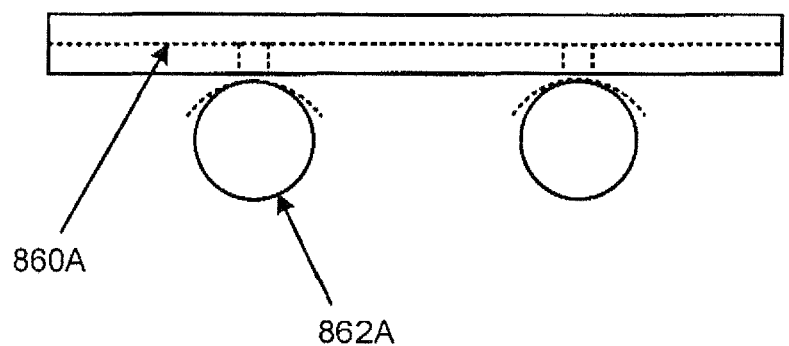

FIGS. 12A and 12B illustrate two other embodiments of the invention. FIG. 12 is a cross-sectional side view of an electrically connectable tile module 810, in accordance with a ninth exemplary embodiment of the invention. The electrically connectable tile module 810 includes a substantially rigid grid 888 containing grid electrical conductors 890. A substrate 812 having a top side 814, a bottom side 816, and at least two side edges 818 is integrally mounted to the substantially rigid grid 888. At least one connector 838 is integral with the substantially rigid grid 888 and connected to the substrate 812. The connector 838 allows the substrate 812 to be electrically connected to the substantially rigid grid 888. At least one electrical element is disposed over the top side 814 of the substrate 812 and electrically connected to the connector 838. As shown in FIG. 12, the electrical element may include an electroluminescent element 844, a thermovoltaic element 820, and a photovoltaic element 822.

As shown in FIG. 12, the electrically connectable tile module 810 may also include a heat sink 860 integrated with at least one of the electrical elements and/or the substrate 812. The electrically connectable tile module 810 may also include at least one substrate electrical conductor 834 connected to the at least one connector 838 and integral with the substrate 812.

As shown in FIG. 12, the electrically connectable tile module 810 may also include a fluid system. The fluid system includes at least one fluid conduit 862 integral with the substrate 812. At least one fluid connector 864 is integral with the fluid conduit 862. Alternatively, as shown in FIGS. 12A and 12B, the fluid conduit 862A may be snap fitted or attached to the back surface of the tile module 810A in thermal communication with the heat sink 860A. Alternatively, the fluid conduits may be formed as an integral part of the heat sink or thermovoltaic, e.g. by extrusion. The fluid connector 864 allows adjoining electrically connectable tile modules 810 to fluidly connect through the substantially rigid grid 888. The fluid system may also include a pump in fluid communication with the fluid conduit 862. The pump may be capable of circulating fluid through the fluid conduit 862. Also, the heat sink 860 may be in thermal communication with the fluid conduit 862 and/or in thermal communication between the fluid conduit 862 and the electrical element and/or the substrate 812. The heat sink 860 may operate to enhance heat transfer with a fluid in the fluid conduit 862 and one purpose of the fluid conduit may be to allow heat transfer to and from the electrically connectable tile module 810. A storage tank may be provided in fluid communication with the fluid conduit 862. The storage tank may operate to store heated fluid, which may be transported therefrom for other applications.

The substrate 812 may be porous, nonporous, or a combination thereof. The substrate 812 may be integral with a mechanical connector 872 to facilitate connection to the substantially rigid grid 888. The substantially rigid grid 888 may be capable of connection to other substantially rigid grids to form a larger substantially rigid grid.

A switch 870 in electrical communication with the electroluminescent element 844 may control the electroluminescent element 844. The switch 870 may be used to control multiple electroluminescent elements 844 disposed over the top sides 814 of multiple substrates 812. The switch 870 may be a two-position switch, a three-way switch, a dimmer switch, or another style switch known to those having ordinary skill in the art. The switch 870 may be operated manually, or it may operate, for example, through a timer, an automated control, a sensor, or another type of conventional control. The switch 870 may operate as a controller, in communication with the thermovoltaic element 820, and/or the photovoltaic element 822 as well as or instead of the electroluminescent element 844 to provide control to those electrical elements.

The electrically connectable tile module 810 may also include at least one fiber optic cable 878 integral with the substrate 812. The fiber optic cable 878 may be integral with the electroluminescent element 844. The fiber optic cable 878 may be used to illuminate an illuminable screen 874, propagating at least a portion of electromagnetic waves radiated from a radiation source, which may be located remotely with respect to the electrically connectable tile module 810. At least one fiber optic connector 880 may be integral with the fiber optic cable 878, allowing the fiber optic cable 878 to connect to grid fiber optic cables 892 located in the substantially rigid grid, and other electrically connectable tile modules 810 there through. The fiber optic cable 878 may be used to illuminate multiple illuminable screens 874 of multiple electrically connectable tile modules 810, by propagating at least a portion of the electromagnetic waves radiated from one or more radiation sources, which may be located remotely with respect to at least some of the electrically connectable tile modules 810.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. An electrically connectable tile module comprising: a porous substrate having a top side, a bottom side, and at least two side edges; at least one connector integrated into the porous substrate whereby adjoining electrically connectable tile modules are electrically connectable to the porous substrate; at least one electrical element disposed over the top side of the porous substrate and electrically connected to the at least one connector, and further comprising: a first fluid conduit integral with the porous substrate and a first fluid connector integral with the first fluid conduit whereby adjoining electrically connectable tile modules having adjoining conduits are fluidly connectable; and a second fluid conduit disposed to release a wetting surfactant from a supply onto a surface of said module, and a second fluid connector integral with the second fluid conduit whereby adjoining tile modules having adjoining conduits are fluidly connectable.

2. The electrically connectable tile module of claim 1, further comprising a heat sink integrated with at least one of a group consisting of the porous substrate and the at least one electrical element.

3. The electrically connectable tile module of claim 1, further comprising a first conductor connected to the at least one connector and integral with the porous substrate.

4. The electrically connectable tile module of claim 1, further comprising a pump in fluid communication with the first fluid conduit, for circulating a heat transfer fluid through the fluid conduit.

5. The electrically connectable tile module of claim 1, further comprising a heat sink in thermal communication with the first fluid conduit, for enhancing heat transfer with a heat transfer fluid in the first fluid conduit.

6. The electrically connectable tile module of claim 5, further comprising a heat transfer fluid storage tank in fluid communication with the first fluid conduit.

7. The electrically connectable tile module of claim 5, wherein the heat sink is in thermal communication with the at least one electrical element, for enhancing heat transfer between the at least one electrical element and the heat transfer fluid.

8. The electrically connectable tile module of claim 1, further comprising a nonporous substrate attached to the porous substrate.

9. The electrically connectable tile module of claim 1, wherein the porous substrate is mounted to one of a group consisting of a floor, a wall, a roof, and a ceiling.

10. The electrically connectable tile module of claim 1, further comprising a switch in electrical communication with the at least one electrical element.

11. The electrically connectable tile module of claim 1, wherein the at least one electrical element further comprises a multi-color electroluminescent material.

12. The electrically connectable tile module of claim 1, further comprising a mechanical connector integral with the porous substrate, for facilitating mechanical connection to an additional porous substrate.

13. The electrically connectable tile module of claim 1, wherein the at least one electrical element further comprises an illuminable screen disposed over the top side of the porous substrate and a radiation source proximate to the porous substrate, wherein the radiation source is positioned to radiate the illuminable screen.

14. The electrically connectable tile module of claim 1, further comprising:
at least one fiber optic cable integral with the porous substrate; and at least one fiber optic connector integral with the fiber optic cable, whereby adjoining electrically connectable tile modules having adjoining fiber optic cables are connectable.

15. The electrically connectable tile module of claim 1, further comprising an oxidizing coating applied to an outer surface of the at least one electrical element.

16. The electrically connectable tile module of claim 1, further comprising a third conduit for supplying a wetting surfactant from said supply to said second conduit.

17. The electrically connectable tile module of claim 1, further comprising a sensor mounted proximate to the top side of the porous substrate, the sensor in electrical communication with the first connector, whereby triggering the sensor initiates the at least one electrical element.

18. The electrically connectable tile module of claim 1, wherein the at least one connector further comprises a U-shaped electrical connector integrally connected to a bottom side of the porous substrate.

19. The electrically connectable tile module of claim 1, wherein the at least one electrical element further comprises a display screen.

20. The electrically connectable tile module of claim 1, wherein the porous substrate has a density of 10-80%.

21. The electrically connectable tile module of claim 20, wherein the porous substrate has a density of 10-30%.

22. The electrically connectable tile module of claim 1, wherein the substrate comprises a rigid material.

23. The electrically connectable tile module of claim 1, wherein the substrate comprises a flexible material.

24. An electrically connectable tile module comprising: a substantially rigid grid containing electrical conductors; a substrate having a top side, a bottom side, and at least two side edges, the substrate integrally mounted to the substantially rigid grid;
at least one electrical connector integral with the substantially rigid grid connected to the substrate; and at least one electrical element disposed over the top side of the substrate and electrically connected to the at least one connector, and further comprising: a first fluid conduit integral with the substrate for circulating a heat transfer fluid; and a first fluid connector integral with the first fluid conduit; and a second fluid conduit disposed to release a wetting surfactant from a supply onto a surface of said module, and a second fluid connector integral with the second fluid conduit whereby adjoining tile modules having adjoining circuits are fluidly connectable.

25. The electrically connectable tile module of claim 24, further comprising a heat sink integrated with at least one of a group consisting of the substrate and the at least one electrical element.

26. The electrically connectable tile module of claim 24, further comprising at least one conductor connected to the first connector and integral with the substrate.

27. The electrically connectable tile module of claim 24, further comprising a pump in fluid communication with the first fluid conduit, for circulating a heat transfer fluid through the first fluid conduit.

28. The electrically connectable tile module of claim 24, further comprising a heat sink in thermal communication with the first fluid conduit, for enhancing heat transfer with a heat transfer fluid in the first fluid conduit.

29. The electrically connectable tile module of claim 28, further comprising a heat transfer fluid storage tank in fluid communication with the first fluid conduit.

30. The electrically connectable tile module of claim 28, wherein the heat sink is in thermal communication with the at least one electrical element, for enhancing heat transfer between the at least one electrical element and the heat transfer fluid.

31. The electrically connectable tile module of claim 24, wherein the substrate comprises a nonporous substrate.

32. The electrically connectable tile module of claim 24, wherein the substantially rigid grid is mounted to one of the group consisting of a floor, a wall, a roof, and a ceiling.

33. The electrically connectable tile module of claim 24, further comprising a switch in electrical communication with the at least one electrical element.

34. The electrically connectable tile module of claim 24, wherein the at least one electrical element further comprises a multi-color electroluminescent material.

35. The electrically connectable tile module of claim 24, further comprising a mechanical connector integral with the substrate, for facilitating mechanical connection to the substantially rigid grid.

36. The electrically connectable tile module of claim 24, wherein the at least one electrical element further comprises an illuminable screen disposed over the top side of the substrate and a radiation source proximate to the substrate, wherein the radiation source is positioned to radiate the illuminable screen.

37. The electrically connectable tile module of claim 24, further comprising:
at least one fiber optic cable integral with the substrate; and at least one fiber optic connector integral with the fiber optic cable.

38. The electrically connectable tile module of claim 24, further comprising an oxidizing coating applied to an outer surface of the at least one electrical element.

39. The electrically connectable tile module of claim 24, further comprising a third conduit for supply a wetting surfactant from said supply to said second conduit.

40. The electrically connectable tile module of claim 24, further comprising a sensor mounted proximate to the top side of the substrate, the sensor in electrical communication with the first connector, whereby triggering the sensor initiates the at least one electrical element.

41. The electrically connectable tile module of claim 24, wherein the substantially rigid grid is connectable to at least one additional substantially rigid grid.

42. The electrically connectable tile module of claim 24, wherein the at least one electrical element further comprises a display screen.

43. The electrically connectable tile module of claim 24, wherein the substrate comprises a porous substrate.

44. The electrically connectable tile module of claim 43, wherein the porous substrate has a density of 10-80%.

45. The electrically connectable tile module of claim 44, wherein the porous substrate has a density of 10-30%.

46. The electrically connectable tile module of claim 24, wherein the substrate comprises a rigid material.

47. The electrically connectable tile module of claim 24, wherein the substrate comprises a flexible material.

* * * * *